(12) United States Patent
Benham et al.

(10) Patent No.: US 12,172,912 B2
(45) Date of Patent: *Dec. 24, 2024

(54) DISPENSING SYSTEM WITH BYPASS

(71) Applicants: Roger A. Benham, San Diego, CA (US); Daniel O. Benham, San Diego, CA (US); Blaine A. Benham, San Diego, CA (US)

(72) Inventors: Roger A. Benham, San Diego, CA (US); Daniel O. Benham, San Diego, CA (US); Blaine A. Benham, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,632

(22) Filed: Nov. 1, 2023

(65) Prior Publication Data

US 2024/0083787 A1     Mar. 14, 2024

Related U.S. Application Data

(63) Continuation of application No. 17/449,364, filed on Sep. 29, 2021, now Pat. No. 11,840,466.

(60) Provisional application No. 63/084,729, filed on Sep. 29, 2020.

(51) Int. Cl.
  *C02F 1/68*    (2023.01)
  *C02F 1/00*    (2023.01)
  *G05D 7/06*    (2006.01)

(52) U.S. Cl.
  CPC .............. *C02F 1/685* (2013.01); *C02F 1/008* (2013.01); *G05D 7/0688* (2013.01); *C02F 2209/005* (2013.01); *C02F 2209/40* (2013.01); *C02F 2301/043* (2013.01)

(58) Field of Classification Search
  None
  See application file for complete search history.

(56) References Cited

U.S. PATENT DOCUMENTS

| | | |
|---|---|---|
| 1,988,000 A | 1/1935 | Estler |
| 2,419,845 A | 4/1947 | Layton |
| 2,667,663 A | 2/1954 | Blasczyk |
| 2,758,877 A | 8/1956 | Gleason |
| 3,195,558 A | 7/1965 | Klueber et al. |
| 3,266,870 A | 8/1966 | Cianflone |
| 3,776,274 A | 12/1973 | Riley |
| 3,876,544 A | 4/1975 | Fowler |
| 4,063,663 A | 12/1977 | Larson et al. |
| 4,691,732 A | 9/1987 | Johnson et al. |
| 5,225,074 A | 7/1993 | Moini |
| 5,913,327 A | 6/1999 | Zhadanov |
| 5,976,385 A | 11/1999 | King |
| 6,221,321 B1 | 4/2001 | Fleischer et al. |
| 6,241,884 B1 | 6/2001 | Hansen |
| 6,358,425 B1 | 3/2002 | King |
| 6,902,668 B2 | 6/2005 | Benham |
| 8,266,870 B1 | 9/2012 | Stravitz |

(Continued)

*Primary Examiner* — Richard C Gurtowski
(74) *Attorney, Agent, or Firm* — WELSH FLAXMAN & GITLER LLC (57) ABSTRACT

A chemical injection system connects a main water flow to a source of chemicals to a bypass chemical dispenser in a water treatment system. The chemical injection system includes a supply pipe, a return pipe having a bypass chemical dispenser located along a length thereof, and a controlled pumping system including a compounding-rate pump controller connected to a pumping loop.

5 Claims, 6 Drawing Sheets

(56) References Cited

U.S. PATENT DOCUMENTS

| | | | |
|---|---|---|---|
| 11,840,466 B2* | 12/2023 | Benham | C02F 1/688 |
| 2005/0023224 A1 | 2/2005 | Schmitz et al. | |
| 2008/0087611 A1* | 4/2008 | Tomley | C02F 1/686 |
| | | | 210/749 |
| 2009/0194478 A1 | 8/2009 | Saveliev et al. | |
| 2010/0292844 A1 | 11/2010 | Wolf | |

* cited by examiner

DISPENSING SYSTEM WITH BYPASS

CROSS REFERENCE TO RELATED APPLICATION

The present application is a continuation of U.S. patent application Ser. No. 17/449,364, entitled "DISPENSING SYSTEM WITH BYPASS." filed Sep. 29, 2021, which claims the benefit of U.S. Provisional Patent Application Ser. No. 63/084,729, entitled "DISPENSING SYSTEM WITH BYPASS," filed Sep. 29, 2020, both of which are incorporated herein by reference.

BACKGROUND OF THE INVENTION

1. Field of the Invention

The present invention relates to a chemical injection apparatus. In particular, the present invention relates to a water treatment system with a pressurized bypass chemical dispenser (or chemical reservoir) for treating pressurized piping systems in buildings, where the chemical injection rate of the water treatment system is adjusted to be proportional to the flow rate in a supply pipe by means of a bypass loop and compounding pump controller. In accordance with such a system, the pump is supplemented by a secondary bypass to allow accurate adjustment and rapid filling and flushing of the chemical reservoir when servicing.

2. Discussion of Related Art

Many commercial and residential water supplies suffer from objectionable conditions. Often, treatment measures are implemented with the addition of chemical treatments to the water supply, including for example phosphate or silicate compounds. In order to provide effective treatment and to prevent other problems from occurring, it may be necessary to carefully meter the amount of chemical treatment agent to a given quantity of supplied water.

There are specific advantages to the use of a dry powder or granular water treatment chemical, typically comprising silicate and phosphate salts. Some advantages include performance benefits, lower cost, and more practical shipping and storage requirements which lead to saving natural resources. In the case of blended phosphates commonly used for water treatment, the products raw form after production is a dry solid, therefore, the use of the dry powder or granular product avoids the step of having to dissolve the material in water. Again, using the dry powder or granular product for water treatment at the customer's location eliminates the need to ship massive tonnages of water across the country, saving large amounts of money, shipping resources, and fuel.

An example of such a dispenser is disclosed in U.S. Pat. No. 3,266,870 to Cianflone. The patent discloses a dispenser for forming a saturated chemical solution in which fresh water entering a pot is uniformly distributed in a manner decreasing the time required to produce a uniform solution at the draw-off point. The dispenser improves circulation of water that tends to reduce undissolved solids dispersed in the saturated solution, thereby eliminating the need for screens in the outlet line from the feeder. The dispenser also provides improved uniformity in the saturated solution regardless of the level of the dry chemical, thereby providing a more precisely controllable system for chemically treating water.

The present applicant has also designed chemical dispensing system, for example, U.S. Pat. No. 6,902,668. This chemical dispensing system includes a dispenser head member and a chemical holding container for holding chemical. The dispenser head member has a flow entry means for directing fluid flow into the chemical holding container and a flow exit means for directing fluid flow out of the chemical holding container. The flow entry means is in fluid connection with a center-mounted, elongated perforated tubular member extending at least partway into the chemical holding container. The chemical holding container has an opening which is releasably engageable with the dispenser head member for refilling.

Practical experience has shown that the ability to draw off a uniformly saturated solution from a chemical holding container with a soluble solid product collected at the bottom of the container is less reliable as the ratio of the diameter of the container to the length of the container decreases. For example, the "pot" described by Cianflone is spherical in shape, which would have diameter to length ratio of 1.0. An example of a higher diameter to length ratio container would be a cylindrically shaped container with a diameter of 12-inches and a length of 24-inches, which would have a diameter to length ratio of 0.5. For those skilled in the design, manufacture, and installation of this type of water treatment system, a container (often called a "dispenser") with a diameter to length ration of 0.5 has many advantages over a spherically shaped dispenser, including advantages of design, manufacture, and installation. A disadvantage of a lower diameter to length ratio is the increasing difficulty of maintaining a sufficiently saturated solution, and the tendency for the dispenser to stop feeding. The invention described in this application helps overcome these difficulties.

As shown above, there are various methods presently available for the injection of chemicals into pressurized piping systems. These various designs all have their benefits and shortcomings. The present invention is designed to provide additional options for injecting water treatment products into a pressurized water pipe, improve reliability, and provide safer treatment compared to other presently available alternatives, and is particularly important for the improvement in quality and cost benefits to the consumer.

BRIEF SUMMARY OF THE DISCLOSURE

The present invention is directed to an improved chemical dispensing apparatus, which may at least partially overcome the disadvantages of existing systems or provide the consumer with a useful or commercial choice.

In a broad form, the invention resides in a fully pressurized chemical injection system that, while under pressure, is impervious to contaminants from the surrounding ambient environment, and has the capability to provide chemical injection into a remote pipeline that is proportional to the flow of liquid in the pipeline. In the preferred embodiment, the proportional chemical injection is achieved by using a bypass loop, an electronic compounding pump controller, a pump, where the pump is supplemented by a secondary bypass to allow accurate adjustment and rapid filling and flushing of a chemical dispenser.

In one aspect the invention includes a chemical injection system connecting a main water flow to a source of chemicals to a bypass chemical dispenser in a water treatment system. The chemical injection system includes a supply pipe, a return pipe having a bypass chemical dispenser located along a length thereof, and a controlled pumping system including a compounding-rate pump controller connected to a pumping loop.

In some embodiments of the chemical injection system the pumping loop includes a feed pump, a bypass circuit, in which a flow rate in the bypass circuit is controlled by a bypass valve, and a feed control needle valve.

In some embodiments of the chemical injection system the feed pump includes a solenoid pump, a centrifugal pump, or a positive displacement pump.

In some embodiments the chemical injection system includes a first flow circuit between the bypass chemical dispenser and the remote water pipeline and a second flow circuit appurtenant to the first flow circuit, wherein a pump is installed within the second flow circuit.

In some embodiments of the chemical injection system the pumping loop includes a feed pump, a bypass circuit, in which a flow rate in the bypass circuit is controlled by a bypass valve, and a feed control needle valve, and the feed control needle valve is installed after the feed pump and within the second flow circuit to change flow rate within the first flow circuit.

In some embodiments the chemical injection system includes a flow sensor that is used to electronically regulate a pumping rate of the pumping loop.

In some embodiments of the chemical injection system the compounding-rate pump controller is a programmable electronic controller with self-compounding feed rate adjustment.

Other objects and advantages of the present invention will become apparent from the following detailed description when viewed in conjunction with the accompanying drawings, which set forth certain embodiments of the invention.

DETAILED DESCRIPTION

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 6, the chemical injection system 100 of the present invention, and its preferred features and functions are illustrated.

Figure 1:
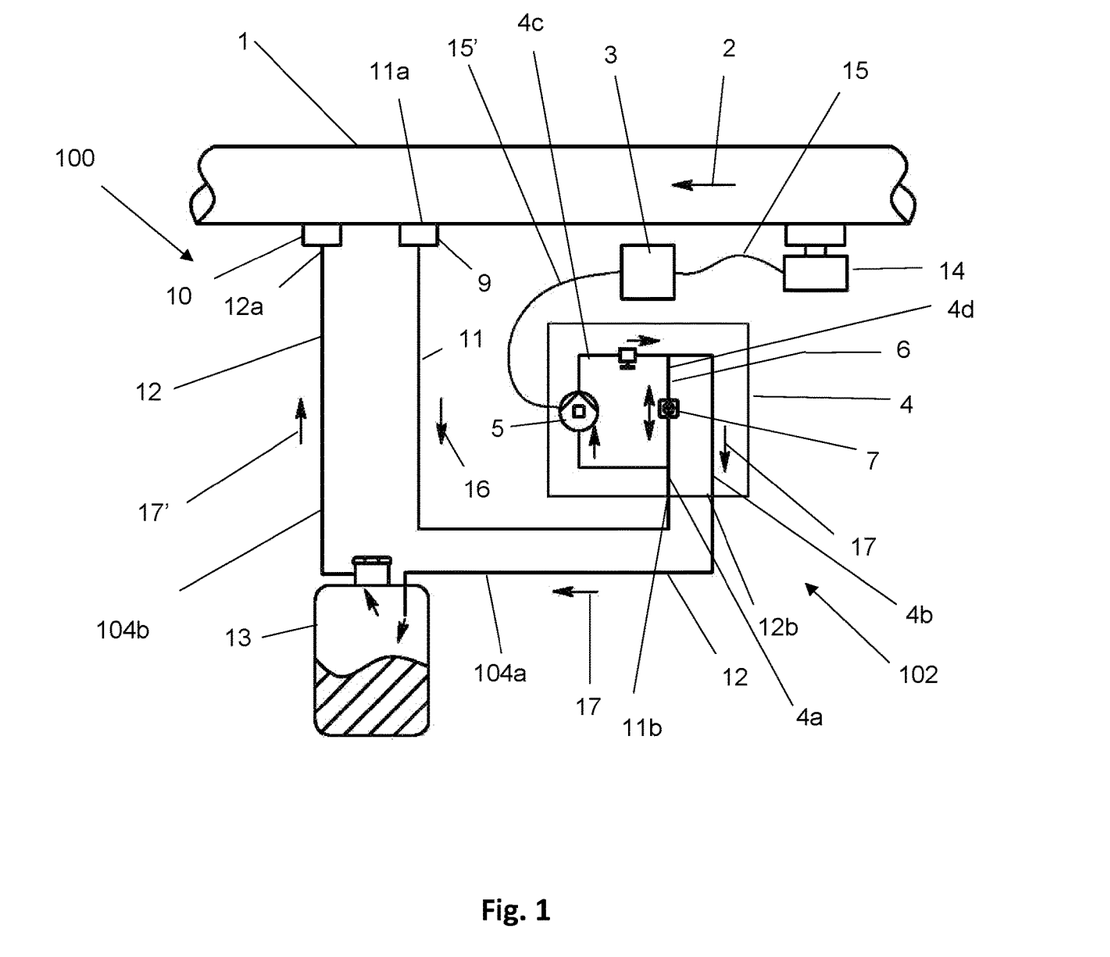
FIG. 1 is a schematic showing a typical layout of an installed water treatment system with a preferred embodiment of the chemical injection system of the present invention.

FIG. 1 shows an installed water treatment system with an embodiment of the chemical injection system 100, along with other ancillary components. The first component in the piping scheme layout of the water treatment system is the pipeline 1 itself with a main water flow 2 that is to be treated with the chemical injection system 100. The chemical injection system 100 connects the main water flow 2 to a source of chemicals in a pressurized bypass chemical dispenser 13. As such, the chemical injection system 100 generally includes a supply pipe 11, a return pipe 12, and a controlled pumping system 102. The controlled pumping system 102 includes a compounding-rate pump controller 3 connected to a pumping loop 4, which is shown as being enclosed in a box marked as pumping loop 4.

The pumping loop 4 includes a feed pump 5, a bypass circuit 6, in which the flow rate in the bypass circuit 6 is controlled by a bypass valve 7, and a feed control needle valve 8. In accordance with a disclosed embodiment, the feed pump 5 is a solenoid pump, although it is appreciated the feed pump may be a centrifugal pump, a positive displacement pump, or other types of pumps known to those skilled in the art.

The supply pipe 11 brings water from the pipeline 1 to an inlet conduit 4a of the pumping loop 4, while the return pipe 12 returns water from outlet conduit 4b of the pumping loop 4 to the pipeline 1. Connecting the inlet conduit 4a to the outlet conduit 4b are a primary conduit 4c and a bypass conduit 4d, wherein the primary conduit 4c and a bypass conduit 4d branch off of the inlet conduit and merge back together at the outlet conduit 4b. As such, a continuous conduit defined by the supply pipe 11, the return pipe 12, the inlet conduit 4a, the bypass conduit 4d, and the outlet conduit 4b forms a first flow circuit between the bypass chemical dispenser 13 and the remote water pipeline 1. A second continuous conduit forming a second flow circuit appurtenant to the first flow circuit is defined by the supply pipe 11, the return pipe 12, the inlet conduit 4a, the primary conduit 4c, and the outlet conduit 4b. The feed pump 5 and the feed control needle valve 8 are installed within the second flow circuit, in particular, along the primary conduit 4c, while the bypass circuit 6 and the bypass valve 7 are installed within the first flow circuit, in particular, along the bypass conduit 4d.

Connected to the pipeline 1 are two piping taps, including a supply tap 9 and a return tap 10. The supply tap 9 is fluidly connected to the pumping loop 4 by a supply pipe 11. In particular, the first end 11a of the supply pipe 11 is fluidly connected to the supply tap 9, and ultimately the main water flow 2, and the second end 11b of the supply pipe 11 is fluidly connected to the pumping loop 4. The return tap 10 is fluidly connected to the pumping loop 4 by a return pipe 12. In particular, the first end 12a of the return pipe 12 is fluidly connected to the return tap 10, and ultimately the main water flow 2, and the second end 12b of the return pipe 12 is fluidly connected to the pumping loop 4. The bypass chemical dispenser 13 is located along the length of the return pipe 12 between the pumping loop 4 and the return tap 10. As such, the return pipe 12 includes a first return pipe segment 104a extending between the pumping looping 4 and the inlet dip tube 22 of the bypass chemical dispenser 13 and a second return pipe segment 104b extending between the outlet port 23 of the bypass chemical dispenser 13 and the return tap 10.

Ancillary components shown in the embodiment shown in FIG. 1 include a flow sensor 14 and the associated wiring 15 between the flow sensor 14 and the compounding-rate pump controller 3, and the associated wiring 15 between the compounding-rate pump controller 3 and the feed pump 5 of the pumping loop 4. It is appreciated the flow sensors are well known and a variety of flow sensors and/or flow meters may be used without departing from the spirit of the present invention. Further, and as discussed below, the compounding-rate pump controller 3 of the present invention can be used with or without a flow sensor (or flow meter). For example, the compounding-rate pump controller 3 may be used without a flow meter in applications where one can feed the proper amount of product using a timer, in cases where one knows how much water is flowing at specific times. For example, the current compounding-rate pump controller 3 could be cycled on-off by a timer four times per day.

The embodiment as configured in FIG. 1 results in a flow pattern with a controllable chemical dispensing rate where fluid from the main water flow 2 enters the pumping loop 4 by means of the supply pipe 11 in the direction of the arrow 16 then enters the bypass chemical dispenser 13 through the return piping 12 in the direction of the bypass water flow 17 and is reintroduced into the pipeline 1 at the return tap 10.

Figure 2:
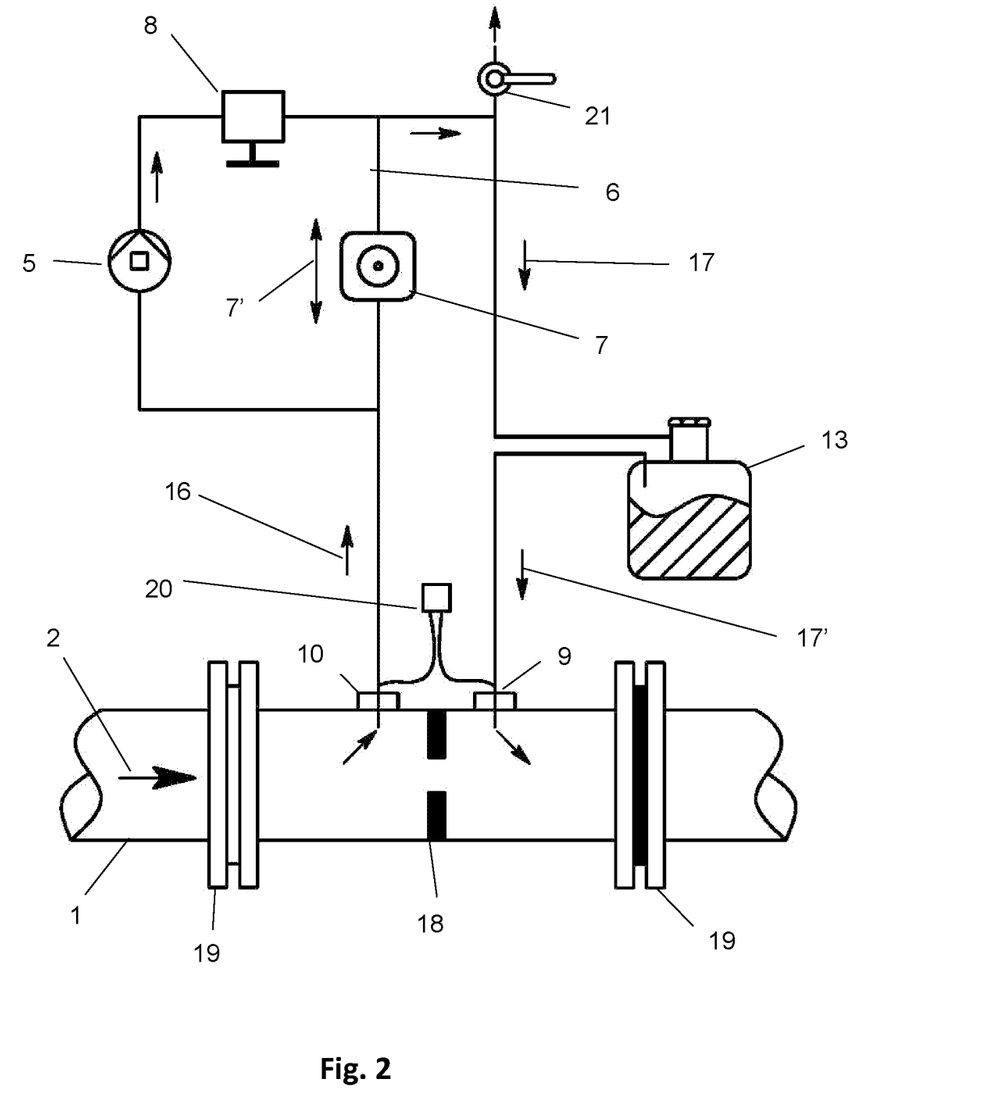
FIG. 2 shows a more detailed layout of the chemical injection system of the present invention including an orifice plate type of flow measuring assembly.

FIG. 2 shows an embodiment of the invention, with more detailed views of the components within the pumping loop 4 and the pipeline 1 shown in FIG. 1. In particular, an orifice plate 18 is installed in the pipeline 1 with flanges 19, to produce a pressure differential relative to the flow in the pipeline 1. A pressure differential sensor 20 is also provided in communication with the pipeline 1 to communicate data to the compounding-rate pump controller 3. A purge valve 21 is shown located at the highest point to vent air from the pressurized pumping loop 4.

Figure 3:
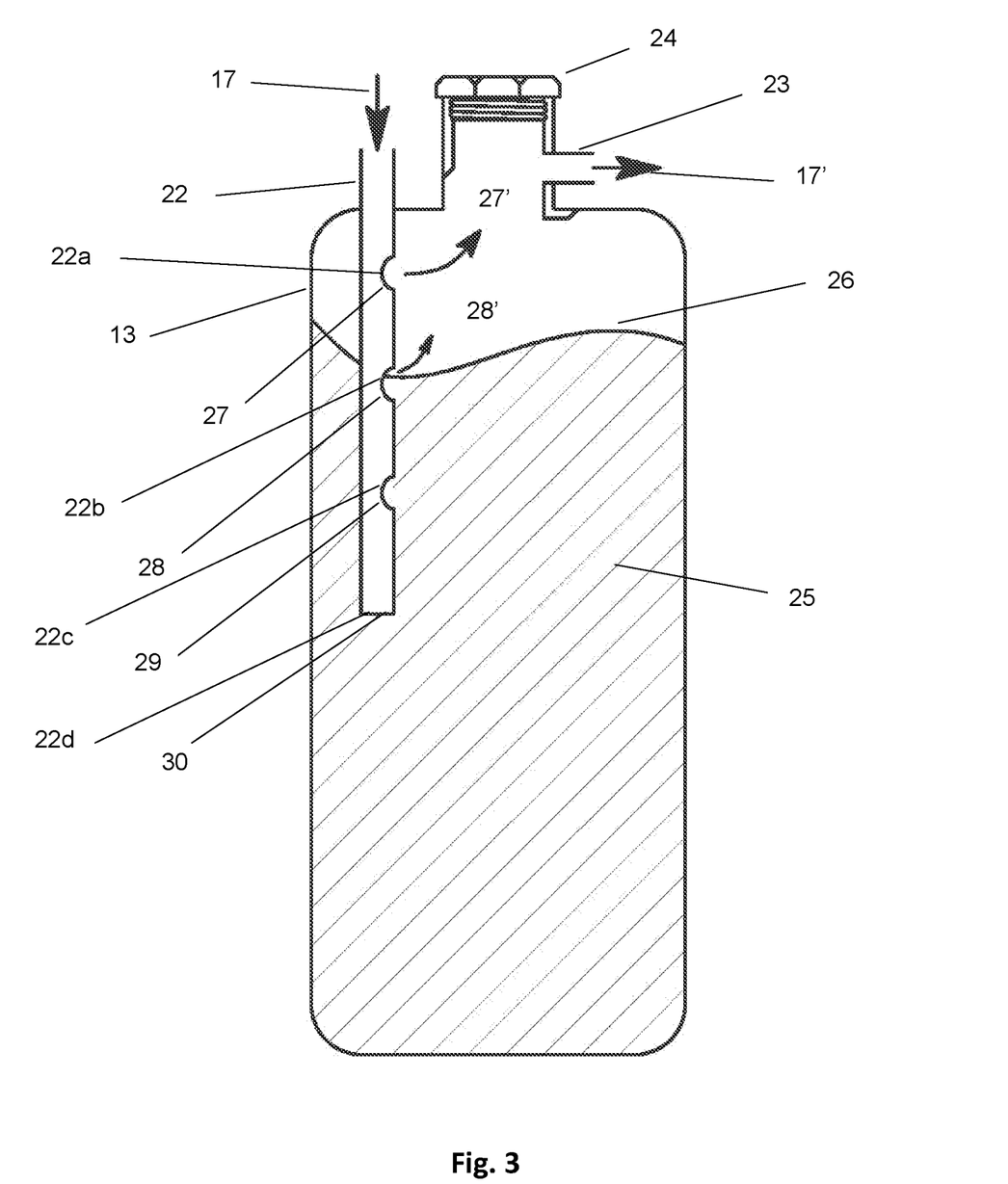
FIG. 3 shows a pressurized dispenser and flow pattern of a dispenser that is nearly full of water treatment chemical product.

FIG. 3 shows a pressurized dispenser and flow pattern of a bypass chemical dispenser 13 that is nearly full of water treatment chemical product 25. It should be noted that the water treatment chemical product 25 is typically added to the bypass chemical dispenser 13 as a dry powder or granular product, however, a liquid or gel chemical product of higher density could be used, where the liquid or gel of higher density would settle at the bottom of the bypass chemical dispenser 13 and feed into solution in a similar manner as a dry powder or granular product. The bypass chemical dispenser 13 has an inlet dip tube 22 connected to the first return piping segment 104a, an outlet port 23 connected to the second return piping segment 104b, and a removable cap 24 that allows the filling of the bypass chemical dispenser 13 with a water treatment chemical product 25. In the example provided in FIG. 3, the water treatment chemical product 25 is nearly filled to the top of the bypass chemical dispenser 13 to a nearly full level chemical surface 26.

It is noted here that the preferred water treatment chemical product 25 that is used in the type of bypass chemical dispenser 13 shown in FIG. 3 is a solid granular product, typically a blend of sodium phosphates, or silicate, or other materials of higher density than the water of the main water flow 2 being treated. As such, the water treatment chemical product 25 settles to the bottom of the bypass chemical dispenser 13. In the typical application, the water treatment chemical product 25 conglomerates into a continuous solid chunk of mass with a nearly full chemical surface 26 that gradually dissolves water treatment chemical into the bypass water flow 17.

As shown in FIG. 3, bypass water flow 17 enters the inlet dip tube 22 of the bypass chemical dispenser 13 via the first return piping segment 104a and exits the bypass chemical dispenser 13 through the outlet port 23 to the second return piping segment 104b. In accordance with the embodiment disclosed with reference to FIG. 3, and as will be discussed below in more detail, the inlet dip tube 22 includes a top dip tube orifice 27, a middle dip tube orifice 28, and a lower dip tube orifice 29, wherein the top dip tube orifice 27, the middle dip tube orifice 28, and the lower dip tube orifice 29 are all of the same size. In the example of having a nearly full level chemical surface 26, the bypass water flow 17 is only able to exit the inlet dip tube 22 at the fully exposed top dip tube orifice 27 near the upper portion 22a of the inlet dip tube 22. This portion of the bypass water flow 17 exiting the top dip tube orifice 27 dissolves water treatment chemical product 25 at the nearly full level chemical surface 26 to form an upper saturated chemical product 27' that exits the outlet port 23 with the bypass water flow 17.

Further shown in FIG. 3, some of the bypass water flow 17 that enters the inlet dip tube 22 exits the inlet dip tube 22 at the partially exposed middle dip tube orifice 28 located at an intermediate position 22b below the upper portion 22a of the inlet dip tube 22. This portion of the bypass water flow 17 exiting the middle dip tube orifice 28 dissolves water treatment chemical product 25 at the nearly full level chemical surface 26 to form a middle saturated chemical product 28' that exits the outlet port 23 with the bypass water flow 17. It is appreciated by those familiar with this type of equipment that the concentration of the middle saturated chemical product 28' will be of higher concentration than the upper saturated chemical product 27'.

As shown in FIG. 3, further down the inlet dip tube 22 in the lower portion 22c of the inlet dip tube 22 is the lower dip tube orifice 29 that is fully encased in the solid chunk of water treatment chemical product 25. In the example of a nearly full level chemical surface 26 there will be no portion of the bypass water flow 17 exiting the lower dip tube orifice 29. It is noted that the bottom end dip tube orifice 30 of the inlet dip tube 22 is simply the open end 22d of the hollow inlet dip tube 22, and it is obvious that with the nearly full chemical surface 26 there would result in no flow out of the bottom end dip tube orifice 30.

Figure 4:
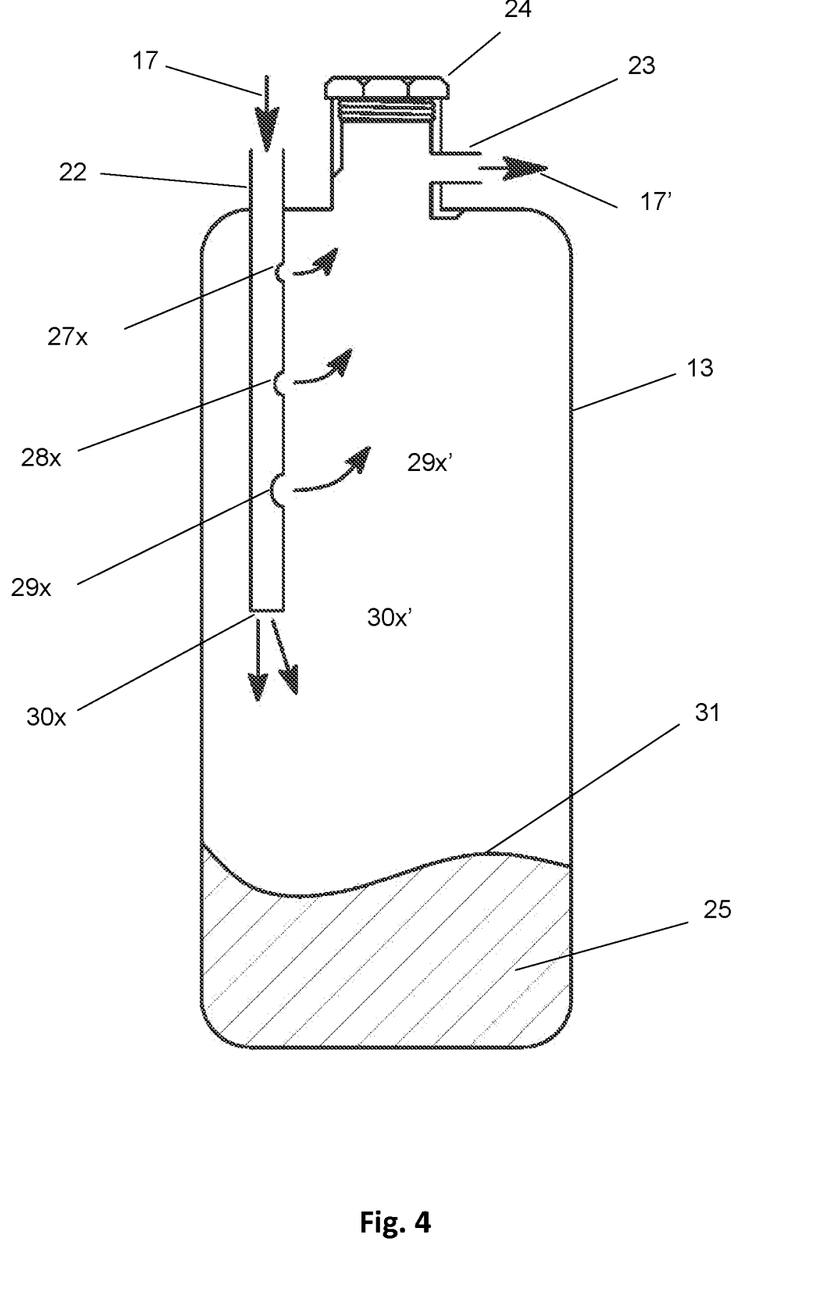
FIG. 4 shows a pressurized dispenser and flow pattern of a dispenser that is nearly empty of water treatment chemical product.
Figure 5:
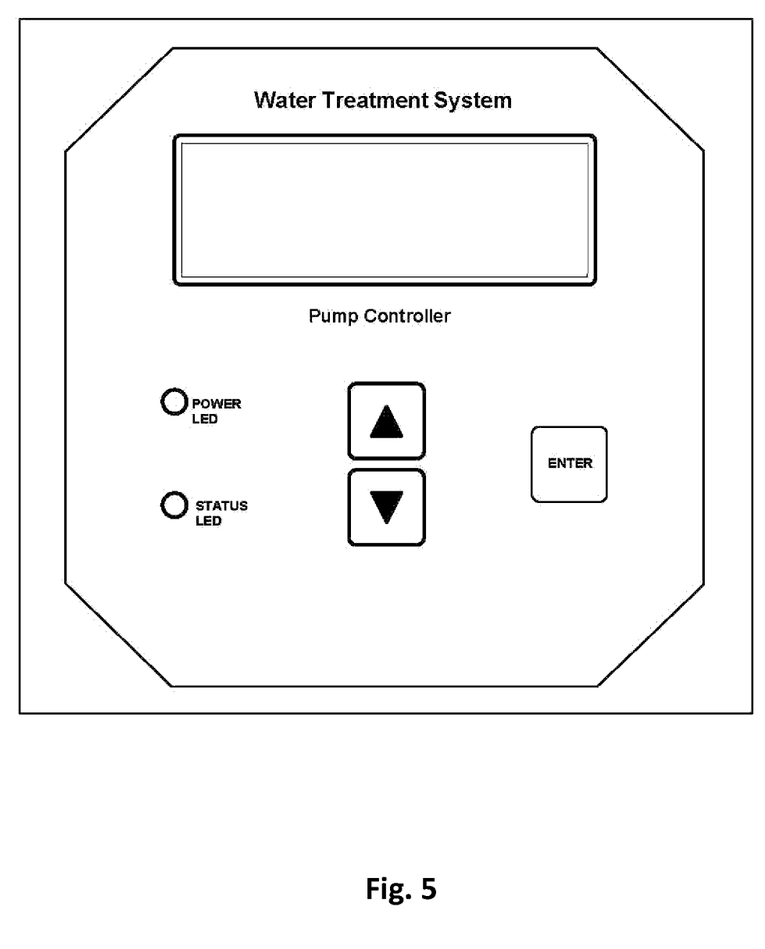
FIG. 5 shows the preferred layout of the faceplate of the invention.

FIG. 4 shows the same basic dispensing and flow patterns as FIG. 3. However, FIG. 4 shows the flow patterns in an example of flow with a bypass chemical dispenser 13 that is nearly empty of water treatment chemical product 25, with a nearly empty chemical surface 31 occurring near the bottom of the bypass chemical dispenser 13.

As shown in FIG. 4, bypass water flow 17 enters the inlet dip tube 22 of the bypass chemical dispenser 13 via the first return piping segment 104a and exits the bypass chemical dispenser 13 through the outlet port 23 to the second return piping segment 104b. In accordance with the embodiment disclosed with reference to FIG. 4, and as will be discussed below in more detail, the inlet dip tube 22 includes a modified top dip tube orifice 27x, a modified middle dip tube orifice 28x, and a modified lower dip tube orifice 29x, wherein the modified top dip tube orifice 27x, the modified middle dip tube orifice 28x, and the modified lower dip tube orifice 29x are of different sizes. In the example of having a nearly empty level chemical surface 31, the bypass water flow 17 is able to exit the inlet dip tube 22 at the all orifices, that is, the modified top dip tube orifice 27x, the modified middle dip tube orifice 28x, and the modified lower dip tube orifice 29x. It is noted here that the modification in the embodiment shown in FIG. 4 is an increasing orifice hole size, where modified top dip tube orifice 27x has a smallest orifice diameter, the modified middle dip tube orifice 28x has a slightly increased orifice diameter, and the modified lower dip tube orifice 29x has an increased orifice diameter respective of the prior described orifices. Since the disclosed embodiment employs a bypass style dispenser system (where the whole treated water stream does not have to go through the dispenser), rather only a small amount of water to dissolve and reintroduce a saturated solution, the dip tube diameter can be as small as ⅜-inch diameter for a smaller dispenser of 12-diameter, and up to ½-inch for dispensers up to 24-inch in diameter. The purpose of the modified dip tube orifices increasing in diameter as they go lower in the bypass chemical dispenser 13 is to direct higher portion of bypass water flow 17 to the lower areas of the bypass chemical dispenser 13 thereby creating a more uniform concentration of water treatment chemical product 25 in the bypass water flow 17.

With reference to FIG. 4, with a nearly empty chemical surface 31 occurring near the bottom of the bypass chemical dispenser 13, there is no solid water treatment chemical product 25 impeding the bypass water flow 17 out of the modified top dip tube orifice 27x, the modified middle dip tube orifice 28x, the modified lower dip tube orifice 29x, or the bottom end dip tube orifice 30x. However, there is a noticeable distance between the inlet dip tube 22 and the nearly empty chemical surface 31.

Continuing with FIG. 4, it is appreciated by those skilled in the use of this type of bypass chemical dispenser 13 that the condition of a lowering chemical product level creates a situation where the concentration of water treatment chemical product 25 in the bypass water flow 17 continues to drop to lower concentrations as the level of solid chemical product 25 drops, illustrated as lowering concentration 29' and further lowering concentration 30', as the level of the chemical products drops below the modified middle dip tube orifice 28x, the modified lower dip tube orifice 29x, or the bottom end dip tube orifice 30x, respectively. This lowering of chemical concentration of water treatment chemical product 25 in the bypass water flow 17 leads to a condition where the performance of the bypass chemical dispenser 13 becomes unacceptable.

In contrast to the dip tube disclosed with reference to the '870 patent discussed above, the dip tube disclosed in accordance with the present invention with reference to FIGS. 3 and 4 only goes about ⅓ of the way down the tank of the bypass chemical dispenser 13 while the dip tube disclosed in the '870 goes all the way to the bottom of the tank. It has been found that if the dip tube is run down to the bottom of the tank it will tend clog and the feed rate will decrease because of not enough flow to the end of the long deep dip tube.

Further, it is noted that the '870 patent discloses a spherical tank. While it is appreciated such spherical tanks work best for small tanks about 12 inches in diameter. However, spherical tanks are harder (more expensive) to make, cumbersome, and often don't fit well in the spaces allowed for equipment. As such, it is appreciated various tank shapes may be used in the bypass chemical dispenser where functionality is not significantly negatively impacted.

With the use of the compounding-rate pump controller 3 (as discussed below in detail) it is possible to use bypass chemical dispenser with tanks having high length-to-diameter ratios (for example, a 12 inch diameter tank that is 48 inches high), because it is possible to gradually increase the pump rate to mix up the product toward the bottom. A bypass chemical dispenser with a tank of these dimensions is very desirable, but in the past has been difficult to make the entire tank of product feed out.

To address the problem described above, where lowering of chemical concentration of water treatment chemical product 25 in the bypass water flow 17 leads to a condition where the performance of the bypass chemical dispenser 13 becomes unacceptable, the compounding-rate pump controller 3 is configured to increase the pumping rate of the feed pump 5 of the pumping loop 4 to a preselected percentage rate increase over a preselected period of time. The front view of the compounding-rate pump controller 3 is shown as FIG. 5.

The compounding-rate pump controller 3 may be programmed to operate in various modes. For example, the compounding-rate pump controller 3 may be programmed to operate in a flow meter mode. When operating in the flow meter mode the compounding-rate pump controller 3 is configured with a separate flow meter, for example, a flow sensor 14 as disclosed in FIG. 1, that electronically communicates to the compounding-rate pump controller 3 the flowrate in the pipeline 1, and the compounding-rate pump controller 3 controls the feed pump 5 to pump according to what values one sets. This communication is by means of the commonly used 4-20 ma circuit, where the compounding-rate pump controller 3 is programmed to instruct the feed pump 5 to pump at a specified rate for the lowest flow (usually, zero flow is set to 4 ma, and the pump rate is set to 0 hz) to the highest flow (usually, the highest flow would be set to 20 ma, and the pump rate would be set to a desired rate, say 20 hz). It should be appreciated that 20 hz means the feed pump 5, which is a solenoid pump in accordance with a disclosed embodiment, will "click" 20 times per second, each "click" being the stroke of a piston, a positive displacement pump, that dispenses about 0.1 ml of fluid.

In the example described above, the "compounding" feature gradually increases the pump rate over a specified number of days. For example, if one sets the compounding for 100% over 60 days, at the end of 30 days, 4 ma would still be 0 hz, but 20 ma would be 30 hz. At the end of 60 days, 4 ma would still be 0 hz, but 20 ma would be 40 hz. At the end of the 60 day period, or any time before, when the system is serviced, the service technician hits the "reset" command, and the cycle goes back to day one, the 60 day cycle starts all over again.

The compounding-rate pump controller 3 may also be programmed to operate in a timer mode. That is, the compounding-rate pump controller 3 can be configured to operate solely based on an on-off timer that turns the feed pump 5 on at an initial pump rate. In the timer mode, no flow sensor (or flow meter) is used. The compounding-rate pump controller 3 has a maximum four time-zones to operate. Each time zone can be programmed to operate every day of the week, or selected days of the week.

When the "compounding" feature is used, the initial pump rate is programmed into the compounding-rate pump controller 3 as the desired pump rate for day one. For example, if the initial pump rate is programmed to be 10 hz, and the "compounding" feature is set for 100% over 60 days the "compounding" feature would gradually increase the pump rate over the next 60 days to double the initial pump rate setting. For example, at the end of 30 days the pumping rate would be 15 hz. At the end of 60 days, pumping rate would be 20 hz (a 100% increase from the initial pump rate setting). At the end of the 60 day period, or any time before, when the system is serviced, the service technician hits the "reset" command, and the cycle goes back to day one, the 60 day cycle starts all over again.

As an example of how the compounding-rate pump controller 3 works, when the bypass chemical dispenser 13 is newly filled and has the nearly full chemical surface 26 condition, the pumping rate is set at 5 Hz for a main water flow 2 rate of 250 gallons per minute (gpm). With the compounding-rate pump controller 3 one can program the feed pump 5 to increase the pump rate 100% (to a rate of 10 Hz) over a period of 60 days (when the next service call is scheduled). In this example, when the service technician arrives on the next service call, the pump rate would have gradually increased, in a linear increase, between 5 hz and 10 hz. The increase in pumping rate from 5 hz to 10 hz, or whatever combination of pump rate increase and service period setting to one skilled in the art of dispensing system performance, would have produced an gradual increase in the rate of the bypass water flow 17 in the bypass chemical dispenser 13, between the nearly full chemical surface 26 condition and the nearly empty chemical surface 31 condition, to produce a consistent chemical feed to the main water flow 2 and a fully emptying out of the bypass chemical dispenser 13.

Figure 6:
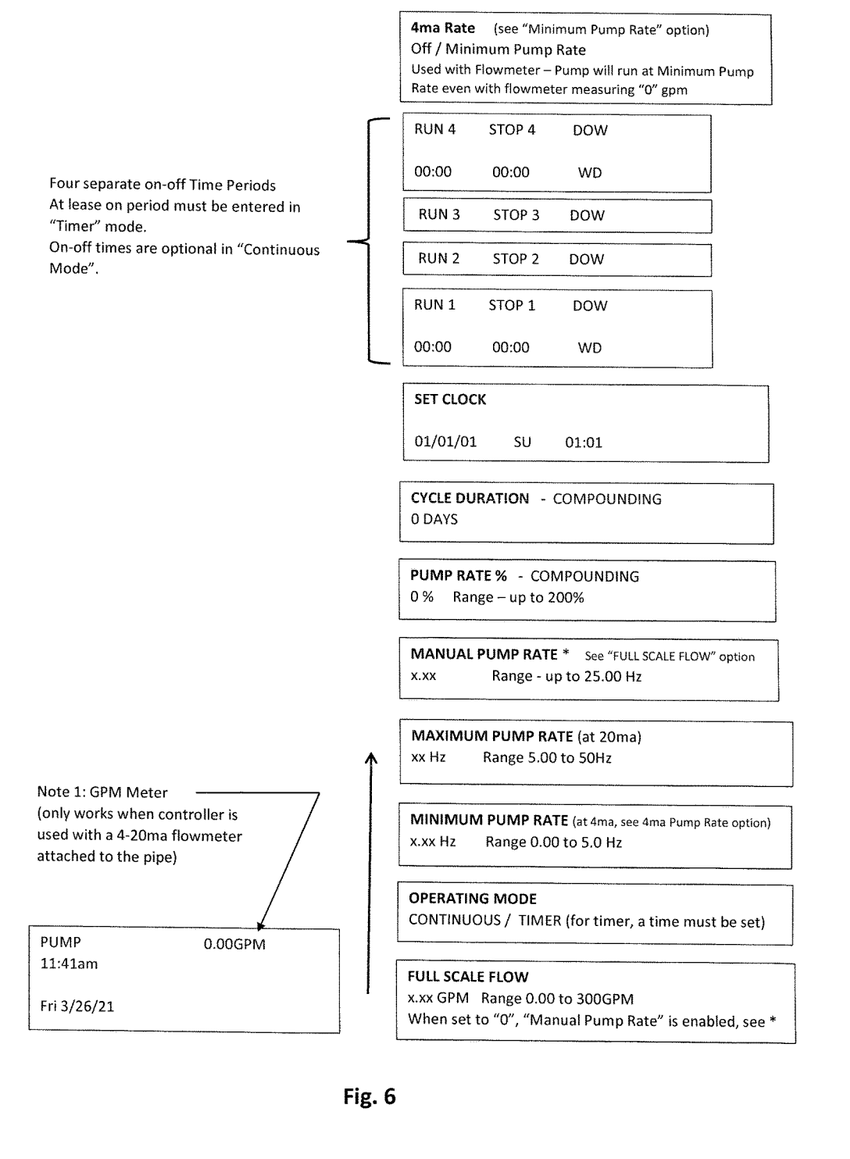
FIG. 6 is an operational "flowchart" of the compounding-rate pump controller.

With reference to FIG. 6, an operational flowchart of the compounding-rate pump controller 3 in accordance with a disclosed embodiment is provided. Installed in the correct physical configuration with all components, the compounding-rate pump controller 3 is unlocked to allow the adjustment of settings through the input of a pre-programmed unlock button sequence. The up and down buttons allow a user to cycle through the settings for observation and adjustment.

In practice, setting up the compounding-rate pump controller 3 involves both the physical installation of the device with connections to all appropriate components as well as the proper programming of the settings of the compounding-rate pump controller 3. The compounding-rate pump controller 3 must be fastened in the desired way in the install location. Power must be provided to the compounding-rate pump controller 3. Powered on, the display of the compounding-rate pump controller 3 will show a summary screen of relevant information such as the date/time, pump status (running or not), flow rate in treated pipe (if applicable), etc. The operator can cycle through all programmable settings using the up and down buttons on the faceplate of the compounding-rate pump controller 3 to select next and previous settings respectively. To adjust a particular setting, the user must enter adjustment mode by inputting a button sequence using the controls. Upon inputting the unlock button sequence, the user will be able to cycle through the programmable functions as before, but also be able to adjust the setting by pressing the enter button when viewing a particular setting. An asterisk is shown on screen when the compounding-rate pump controller 3 is in adjustment mode. When the settings of the compounding-rate pump controller 3 are configured to the desire of the user, a timeout will return the controller from adjustment mode.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the description and claims appropriately interpreted by those skilled in the art.

The invention claimed is:

1. A chemical injection system connecting a main water flow to a source of chemicals to a bypass chemical dispenser in a water treatment system, the chemical injection system comprising:
   a supply pipe bringing water from a pipeline of the main water flow to a pumping loop;
   a return pipe connected to the pumping loop for returning water from the pumping loop to the pipeline, the return pipe having a bypass chemical dispenser located along a length thereof; and
   a controlled pumping system connected between the supply pipe and the return pipe, the control pumping system including a compounding-rate pump controller connected to the pumping loop, wherein the compounding-rate pump controller is a programable electronic controller with self-compounding feed rate adjustment controlling a pumping rate of a feed pump of the pumping loop based upon a total volume of water measured by a flow meter.

2. The chemical injection system according to claim 1, further including a first flow circuit between the bypass chemical dispenser and a remote water pipeline in which the main water flow flows and a second flow circuit appurtenant to the first flow circuit, wherein a pump is installed within the second flow circuit.

3. The chemical injection system according to claim 2, wherein the pumping loop includes a feed pump, a bypass circuit, in which a flow rate in the bypass circuit is controlled by a bypass valve, and a feed control needle valve, and the feed control needle valve is installed after the feed pump and within the second flow circuit to change flow rate within the first flow circuit.

4. The chemical injection system according to claim 1, wherein increasing of pumping rate is such that concentration of product is maintained.

5. The chemical injection system according to claim 4, wherein at a constant flow rate in the water pipeline, the pump rate increases over time as the chemical dispenser empties to maintain a constant concentration of chemical product in the treated water, downstream of the treatment system, in the water pipeline.

\* \* \* \* \*